US 8,255,822 B2

(12) United States Patent
Markiewicz et al.

(10) Patent No.: US 8,255,822 B2
(45) Date of Patent: Aug. 28, 2012

(54) INCORPORATED HANDWRITING INPUT EXPERIENCE FOR TEXTBOXES

(75) Inventors: Jan-Kristian Markiewicz, Redmond, WA (US); Thomas Randall Wick, Seattle, WA (US); Krishna Kotipali, Issaquah, WA (US); Adrian James Garside, Sammamish, WA (US); Takanobu Murayama, Seattle, WA (US); Susan E. Dziadosz, Seattle, WA (US); Tracy Dianne Schultz, Seattle, WA (US); Leroy B. Keely, Portola Valley, CA (US); Thomas H. Alphin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 11/963,774

(22) Filed: Dec. 21, 2007

(65) Prior Publication Data

US 2009/0159342 A1    Jun. 25, 2009

(51) Int. Cl.
*G06F 3/048* (2006.01)
(52) U.S. Cl. ........ 715/780; 715/858; 715/815; 715/866; 715/711
(58) Field of Classification Search ............... 178/18.01; 715/808, 768, 863, 780, 858, 815, 866, 711, 715/264; 382/188; 708/160
See application file for complete search history.

(56) References Cited

U.S. PATENT DOCUMENTS

| | | | |
|---|---|---|---|
| 5,655,136 A | 8/1997 | Morgan | |
| 5,710,831 A | 1/1998 | Beernink | |
| 5,991,441 A | 11/1999 | Jourjine | |
| 6,088,481 A * | 7/2000 | Okamoto et al. | 382/189 |
| 6,340,967 B1 | 1/2002 | Maxted | |
| 6,791,537 B1 | 9/2004 | Shim | |
| 6,989,822 B2 | 1/2006 | Pettiross | |
| 7,158,678 B2 | 1/2007 | Nagel | |
| 7,174,042 B1 | 2/2007 | Simmons | |
| 7,215,815 B2 | 5/2007 | Honda | |
| 7,259,752 B1 | 8/2007 | Simmons | |
| 7,277,089 B2 | 10/2007 | Keely | |
| 2003/0028851 A1 | 2/2003 | Leung | |
| 2003/0071850 A1 * | 4/2003 | Geidl | 345/781 |
| 2003/0210268 A1 * | 11/2003 | Kataoka et al. | 345/762 |
| 2003/0214540 A1 * | 11/2003 | Huapaya et al. | 345/863 |
| 2003/0222918 A1 * | 12/2003 | Coulthard | 345/780 |
| 2004/0008222 A1 * | 1/2004 | Hovatter et al. | 345/749 |
| 2004/0008228 A1 * | 1/2004 | Smith | 345/780 |
| 2004/0093568 A1 * | 5/2004 | Lerner et al. | 715/541 |
| 2004/0160427 A1 * | 8/2004 | Keely et al. | 345/179 |

(Continued)

OTHER PUBLICATIONS

CalliGrapher 8.5 User'S Guide, http://www.phatware.com/doc/CalliGrapher8/UserGuide.pdf.

(Continued)

*Primary Examiner* — Tadeese Hailu
(74) *Attorney, Agent, or Firm* — Shook Hardy & Bacon LLP

(57) ABSTRACT

Textboxes are provided to support both standard textbox operations and handwriting input. A textbox may be displayed as a standard textbox, receive input from a keyboard, a pointing device (e.g., a mouse), and/or a handheld writing device (e.g., an electronic pen or stylus), and interpret the input to perform standard textbox operations. Based on various user actions, the textbox is displayed as an enlarged textbox that provides a writing surface for receiving input from the handheld writing device that is interpreted as handwriting input. Text is recognized from the handwriting input, and the text from the enlarged textbox is synchronized with the textbox.

19 Claims, 6 Drawing Sheets

U.S. PATENT DOCUMENTS

| | | | |
|---|---|---|---|
| 2005/0099406 A1* | 5/2005 | Pettiross et al. | 345/179 |
| 2005/0099407 A1* | 5/2005 | Pennington et al. | 345/179 |
| 2005/0102620 A1* | 5/2005 | Seto et al. | 715/541 |
| 2005/0190973 A1 | 9/2005 | Kristensson | |
| 2006/0007189 A1 | 1/2006 | Gaines | |
| 2006/0007190 A1* | 1/2006 | Pettiross et al. | 345/179 |
| 2006/0033719 A1 | 2/2006 | Leung | |
| 2006/0209040 A1* | 9/2006 | Garside et al. | 345/173 |
| 2006/0230350 A1 | 10/2006 | Baluja | |
| 2006/0253777 A1 | 11/2006 | Yalovsky | |
| 2007/0022370 A1 | 1/2007 | Lagardere | |
| 2007/0140561 A1 | 6/2007 | Abdulkader | |
| 2008/0235578 A1* | 9/2008 | Heed et al. | 715/269 |
| 2008/0276194 A1* | 11/2008 | Dykstra-Erickson et al. | 715/780 |
| 2009/0161959 A1* | 6/2009 | Markiewicz et al. | 382/187 |

OTHER PUBLICATIONS

CalliGrapher 8.5 User's Guide, 2001-2007 PhatWare Corp. http://www.phatware.com/doc/CalliGrapher8/UserGuide.pdf.

Tanaka, et al. Online Handwriting Recognition Technology and Its Applications, Nov. 28, 2003, http://www.fujitsu.com/downloads/MAG/vol40-1/paper23.pdf.

Vision Objects Leading provider of Handwriting Recognition Technology, Feb. 22, 2007, http://www.visionobjects.com/telechar/Factsheet_Vision_Objects_(English_Version)-16-en.pdf.

Madhvanath, et al., LipiTk: A Generic Toolkit for Online Handwriting Recognition, 2006, http://lipitk.sourceforge.net/docs/LipiTk_IWFHR10_Final.pdf.

Active Ink Software, Jul. 4, 2003 http://activeinksoftware.com/documents/ActiveInkSoftwareWhitePaper.pdf.

Long, et al., A Prototype User Interface for a Mobile Multimedia Terminal1, 1995, http://bwrc.eecs.berkeley.edu/Publications/1995/ui_for_mobile_multimedia.chi95/prototype-ui-for-mm-terminal.pdf.

Oboyle, et al, An Automatic Configuration System for Handwriting Recognition Problems, 2000, http://www.springerlink.com/content/2fkjju277u9t7b5t/fulltext.pdf.

Electronic Document & Records Management Modules, Retrieved Oct. 2007, http://www.idoxplc.com/iii/doc/IDOX%20Software:%20 Electronic%20Document%20&%20Record%20Management%20Brochure.pdf;jsessionid=AC386C1A75EC17B35E2F71D6DC1BC88E?extension=. pdf&wmTransparency=0&id=3913091&wmLocation=0&location=Volume3&contentType=application%2Fpdf&wmName=&pageCount=1.

* cited by examiner

INCORPORATED HANDWRITING INPUT EXPERIENCE FOR TEXTBOXES

BACKGROUND

Typical computer systems, especially computer systems using graphical user interface (GUI) systems, are optimized for accepting user input from one or more discrete input devices. Common input devices include a keyboard for entering text and a pointing device, such as a mouse with one or more buttons, for controlling the user interface. The keyboard and mouse interface facilitates user interaction with computer systems such as for the creation and modification of electronic documents including text, spreadsheets, database fields, drawings, and photos.

One of the limitations with conventional GUI systems is that a user must generally type the text they are entering into the computer system using the keyboard. More recently, however, pen-based computing systems, such as tablet PCs and the like, have been increasing in popularity. In pen-based computing systems, user input advantageously may be introduced using an electronic "pen" or stylus. More particularly, a user can write with the stylus on the screen of the electronic tablet or other appropriate surface in a similar manner to traditional pen and paper. The strokes of the user's handwriting with the stylus are read and used to recreate the handwriting in electronic form on the screen with "digital ink." In some cases, the user's handwriting may be recognized, and the digital ink may be converted to text that may be used by applications on the computing system.

Although pen-based computing systems are becoming more popular and users are increasingly entering more data in the form of digital ink, many operating systems and applications are still designed specifically for keyboard text input, which often makes it difficult to add support for handwriting input. One particular element of traditional operating systems and applications that is not particularly well-suited for pen-based input is the textbox. As is known in the art, textboxes are graphical user interface elements commonly used by many computer applications to allow users to enter text that may be used by the applications. Non-limiting examples of textboxes include search query input boxes, web browser address bars, email input boxes (e.g., "To" field, "Cc" field, "Subject" field, etc.), open/save dialog boxes, and input boxes for forms.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to integrating handwriting input into standard textboxes. In particular, a textbox may be presented and operate in at least two states, based on user interactions with the textbox, to support both standard textbox operations and handwriting input. The textbox may be presented as a standard textbox when a user employs a keyboard and/or a pointing device (such as a mouse). Additionally, the textbox may be configured to receive input from a handheld writing device, such as an electronic pen or stylus, and interpret the input to perform standard textbox operations, as opposed to inking. Based on various user actions, the textbox may be presented as an expanded textbox. In an embodiment, this may include displaying a writing surface over the textbox. When a user interacts with the expanded textbox using the handheld writing device, the input is interpreted as handwriting input. Digital ink is initially displayed based on the handwriting input and is then replaced with text recognized from the handwriting input using a recognizer. In an embodiment, the text in the expanded textbox is synchronized with the text in the underlying textbox.

BRIEF DESCRIPTION OF THE DRAWINGS

The present invention is described in detail below with reference to the attached drawing figures, wherein.

DETAILED DESCRIPTION

Figure 1:
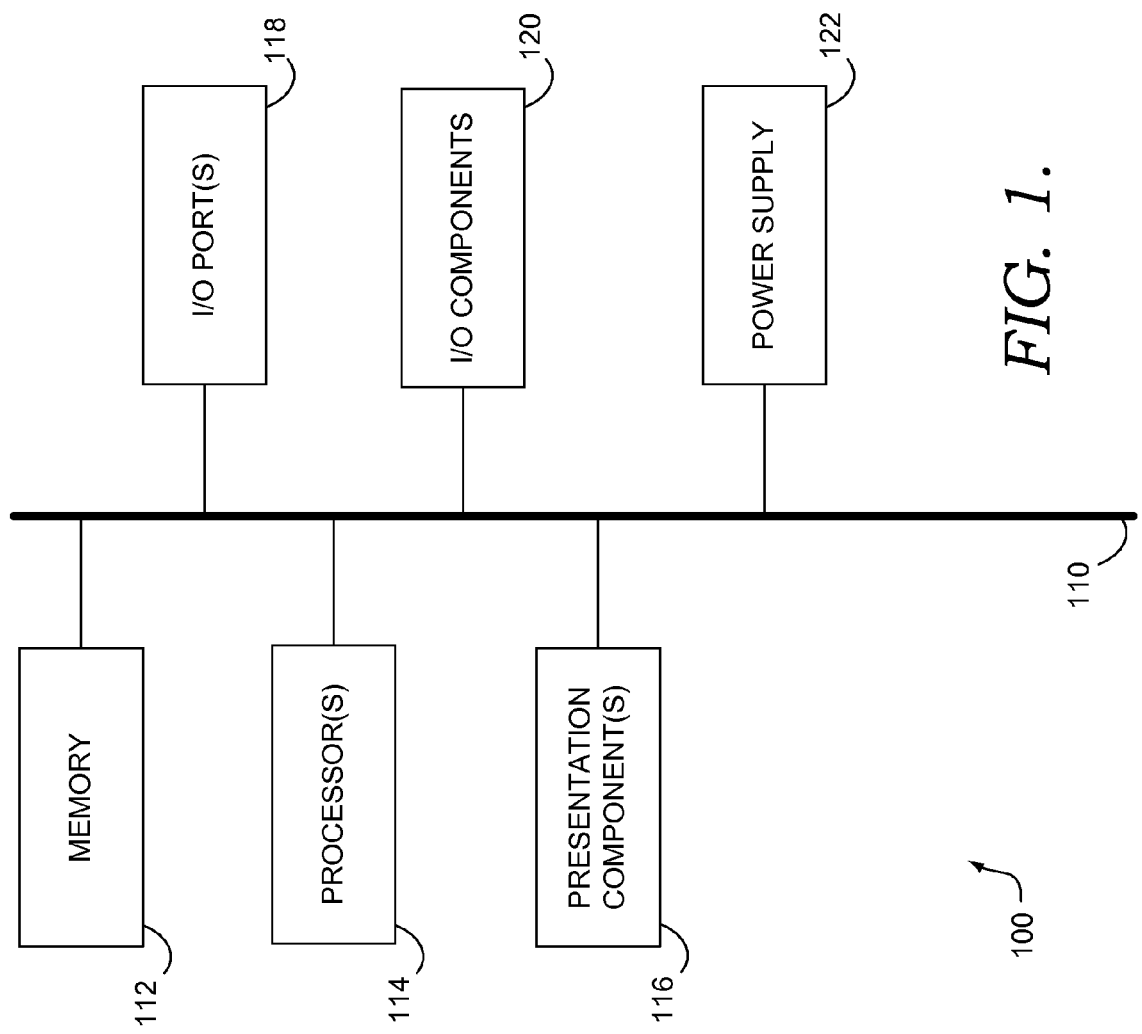
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

As indicated previously, textboxes commonly used as user interface elements by operating systems and applications are not particularly well-suited for pen-based computing systems. For instance, textboxes typically support a variety of standard textbox operations, such as text selection, cutting, pasting, copying, deleting, and undoing, to name a few. However, it is difficult to provide an approach for using a handheld writing device, such as electronic pen or stylus, to provide such operations as movement of the handheld writing device relative to a writing surface is typically recognized as ink strokes. Additionally, standard textboxes are usually relatively small, which makes it difficult for users to enter handwriting input into the textboxes as handwriting typically requires a considerable amount of space. One previous approach to this problem is to provide a detached input panel that is large enough to receive handwriting input from an electronic pen or stylus and then send the input to a textbox after a user selects to insert the text to the textbox. However, this approach feels disconnected from the textbox for the user and is tedious for the user since it requires the user to perform a number of steps to input text into the textbox. In particular, the user has to first set focus in the textbox, launch the input panel (which is displayed separate from the selected textbox), write within the input panel, make corrections (often in a separate correction area), select to have text corresponding with the handwriting input inserted into the textbox, and then close the input panel.

Embodiments of the present invention relate to an approach to incorporating a handwriting input surface to any standard textbox to provide an enhanced user experience while also making it possible to perform standard textbox operations with a handheld writing device, such as an electronic pen or stylus. In an embodiment, a "pen-friendly textbox" is provided that may operate in at least two main states. In the first state, the textbox looks and behaves as a standard textbox to receive keyboard and mouse inputs. Additionally, while in the first state, the user may perform standard textbox operations (e.g., select, cut, paste, copy, delete, undo, etc.) using a handheld writing device. In the second state, an expanded textbox is displayed in place of the standard textbox. The expanded textbox is a writing surface that accepts handwriting input and is displayed over the standard textbox. As used herein, the term "writing surface" includes a user interface element that provides an area for receiving handwriting input from a handheld writing device, such as an electronic pen or stylus.

The expanded textbox allows the user to provide text converted from handwriting input directly into the textbox. In particular, the text that is within the expanded textbox is synchronized with the text that is within the underlying textbox. As such, the user does not need to explicitly insert text from the writing surface into the textbox. Depending on different user actions within various embodiments of the invention, the state of the textbox will switch between the standard text box (to receive input for standard textbox operations from a keyboard, mouse, or handheld writing device) and the expanded text box (to receive handwriting input).

Accordingly, in one aspect, an embodiment of the invention is directed to one or more computer-storage media embodying computer-useable instructions for performing a method. The method includes displaying a textbox wherein the textbox is configured to receive input from a handheld writing device and interpret the input as one or more standard textbox operations. The method also includes based on one or more user actions, displaying an expanded textbox in place of the textbox, wherein the expanded textbox is configured to receive input from the handheld writing device and interpret the input as handwriting input. The input is initially displayed as digital ink within the expanded textbox and then converted to text within the expanded textbox after the digital ink has been recognized as the text using a recognizer.

In another embodiment of the invention, an aspect is directed to a method for providing handwriting input to a textbox. The method includes displaying the textbox, wherein the textbox is configured to receive input from a keyboard, a mouse, and a handheld writing device to perform standard textbox operations. The method also includes displaying text within the textbox based on input received from the keyboard. The method further includes based on one or more user actions, displaying a writing surface over the textbox, wherein the writing surface is presented as an enlarged textbox corresponding with the textbox, and wherein the text from the textbox is displayed within the writing surface. The method also includes receiving input from the handheld writing device within the writing surface, interpreting the input as handwriting input, and displaying digital ink within the writing surface based on the handwriting input. The method further includes replacing display of the digital ink with display of further text identified from the handwriting input using a recognizer, wherein the further text is displayed with the text from the textbox. The method still further includes automatically synchronizing the further text from the writing surface with the textbox.

A further embodiment of the invention is directed to one or more computer-storage media embodying computer-useable instructions for performing a method. The method includes displaying a textbox in a first state, wherein the textbox is displayed as a standard textbox and is configured to receive input from a keyboard and a pointing device to provide standard textbox operations. The method also includes based on one or more first user actions, displaying the textbox in a second state, wherein the textbox in the second state is configured to receive a first input from a handheld writing device and interpret the first input from the handheld writing device as standard textbox operations, and wherein an icon is displayed adjacent to the textbox, the icon allowing the textbox to be displayed in a third state when the icon is selected. The method further includes based on one or more second user actions, displaying the textbox in the third state by displaying a writing surface over the textbox, wherein the writing surface is configured to receive a second input from the handheld writing device and interpret the second input from the handheld writing device as handwriting input, wherein text is synchronized between the writing surface and the textbox.

Exemplary Operating Environment

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld writing device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, or a mouse. A pen digitizer and an accompanying pen or stylus may be provided in order to digitally capture freehand input (e.g. electronic ink). The pen digitizer may be connected to a serial port interface, directly to the processor 114, or it may be coupled to the processor 114 in any suitable manner, such as via a parallel port or another interface and the system bus 110 as is known in the art. Furthermore, the usable input area of the digitizer may be integrated in a monitor or similar presentation component 116, or it may exist as a separate device overlaying or otherwise appended to a monitor or similar presentation component 116. Using a handheld writing device, such as a stylus, a user can select, highlight, and write on a digitizing display area. Examples of suitable digitizing display panels include electromagnetic pen digitizers and optical digitizers. Other types of pen digitizers may also be used. The digitizer, in connection with the computing system interprets gestures made using the stylus in order to manipulate data, enter text, and execute conventional computer application tasks, such as creating, editing, and modifying spreadsheets, word processing programs, and the like.

The stylus may be equipped with buttons or other features to augment its capabilities. In one example, a stylus could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used as a hand-held writing device in the system of FIG. 1. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). As still further examples, systems may use ".NET" or DCOM (distributed component object model) as additional implementations of the ink platform. Yet further implementations may be used including the Win32 programming model and the .Net programming model form Microsoft Corporation. These platforms are commercially available and known in the art.

In addition to use with full performance pen-based computing systems or "tablet PCs" (e.g. convertible laptops or "slate" type tablet PCs), aspects of this invention can be used in conjunction with other types of pen-based computing systems and/or other devices that accept and/or display data as electronic ink and/or accept and/or display electronic pen or stylus input, such as: hand-held or palm-top computing systems; personal digital assistants; pocket personal computers; mobile and cellular telephones, pagers, and other communications devices; watches; appliances; and any other devices or systems that include a monitor or other display device and/or digitizer that presents printed or graphical information to users and/or allows input using an electronic pen or stylus.

The computing device 100 may also include or be coupled to a digital ink processing software module (not shown). The ink processing module is operable for receiving data from the digitizer and/or the stylus and rendering that data as digital ink (or "wet ink"). Wet digital ink comprises ink that has not been sent to a recognizer to be converted to text. In contrast, "dry ink" comprises digital ink that has been converted to text by a recognizer.

In one exemplary embodiment, the ink processing module comprises a collection of software modules that perform different tasks for recognizing handwriting strokes as digital ink. For example, a stylus and ink module may be provided to receive data describing the positions and angles of the stylus for a series of handwriting strokes. The stylus and ink module interprets the data for recognizing digital ink. Other software modules, such as a recognizer identify certain handwriting strokes and assign them a particular significance. For example, the recognizer converts digital ink to text. In an embodiment, the recognizer breaks the user's handwriting in digital ink down into separate word blocks, evaluates the word blocks, and then upon recognizing a word contained in each word block, converts the digital to word-based text (i.e. text that is typically viewed on a computer monitor or other display device). Additionally, certain gestures (such as a cross-out) may be recognized and associated with other editing processes. The ink processing module can also include an erasing functions module for removing digital ink that has been previously rendered. Those skilled in the art will recognize that the computing device 100 may include or be coupled to other software modules for digital ink processing.

Pen-Friendly Textboxes

As noted previously, in embodiments of the present invention, a pen-friendly textbox may have at least two states to facilitate both standard textbox operation and receiving handwriting input. In one embodiment, a pen-friendly textbox may be presented in two states. In the first state, the pen-friendly textbox is displayed and behaves like a standard textbox. A user may enter text using a keyboard and may perform other standard textbox operations, such as selecting text, cutting, copying, pasting, deleting, and undoing, using a mouse (or other pointing device) and/or using a handheld writing device (such as an electronic pen or stylus). In the second state, the pen-friendly textbox is presented as an expanded textbox. In particular, a writing surface is provided that facilitates receiving input from a handheld writing device and interpreting the input as handwriting input to provide text in the writing surface, which is synchronized with the underlying textbox in the first state.

In another embodiment, a pen-friendly textbox may be presented in three states: a hidden state, a minimized state, and an expanded state. In the hidden state, the pen-friendly textbox is displayed as a standard textbox, and standard textbox operations may be performed using input from a keyboard and/or a pointing device (e.g., a mouse). In the minimized state, the pen-friendly textbox continues to be displayed as a standard textbox but also supports standard textbox operations being performed from input based on a handheld writing device. Additionally, an expanded textbox icon is displayed adjacent to the textbox in the minimized state. If the expanded textbox icon is selected, the pen-friendly textbox is presented in the expanded state. In the expanded state, an expanded textbox is provided that provides a writing surface for receiving handwriting input from a handheld writing device. Additionally, a minimize icon may be displayed adjacent to the expanded textbox that if selected, causes the pen-friendly textbox to be displayed in the minimized state.

Figure 2A:
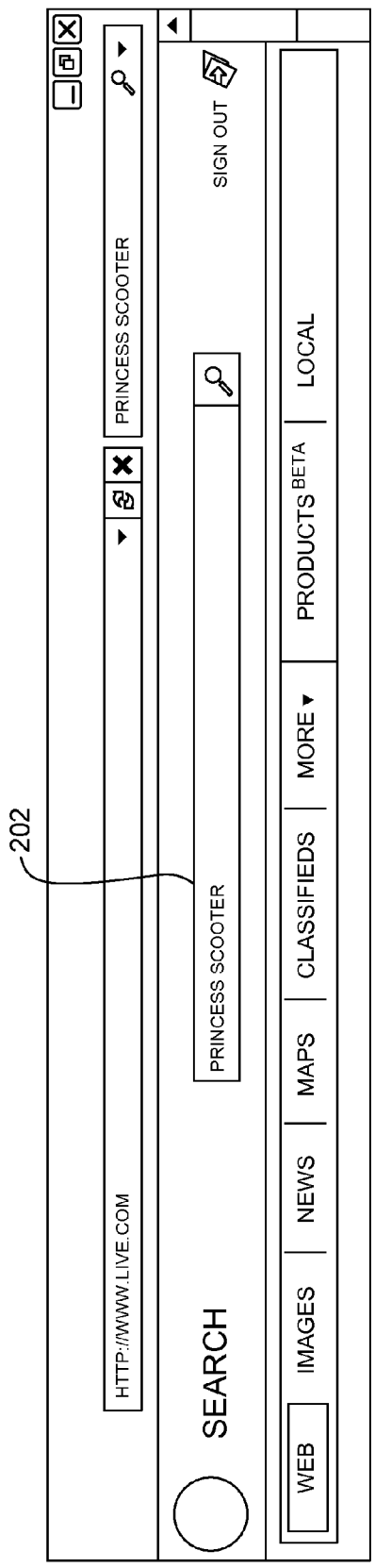
FIG. 2A is a screen display illustrating a pen-friendly textbox in a hidden state in accordance with an embodiment of the present invention.
Figure 2B:
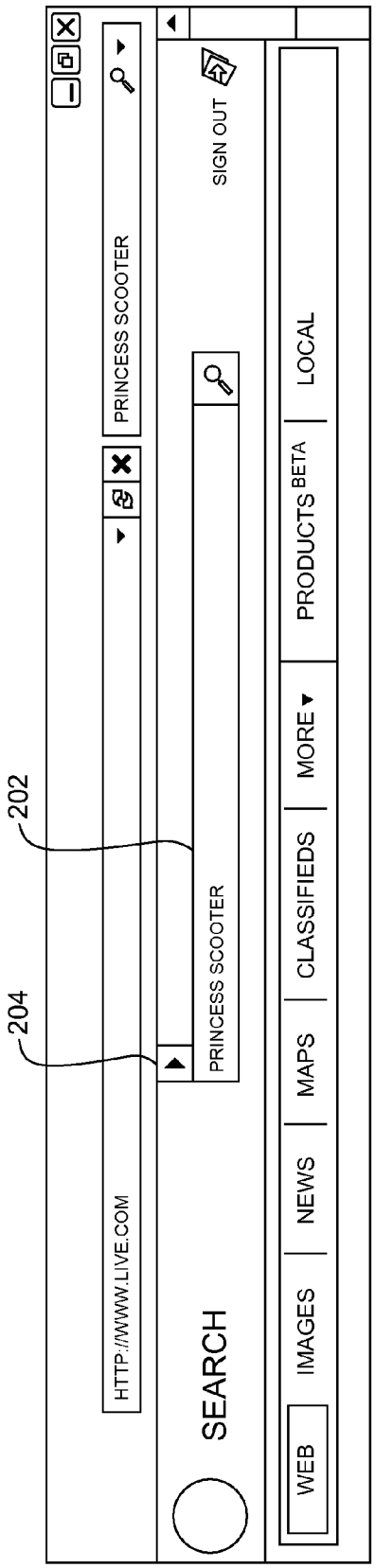
FIG. 2B is a screen display illustrating a pen-friendly textbox in a minimized state in accordance with an embodiment of the present invention.
Figure 2C:
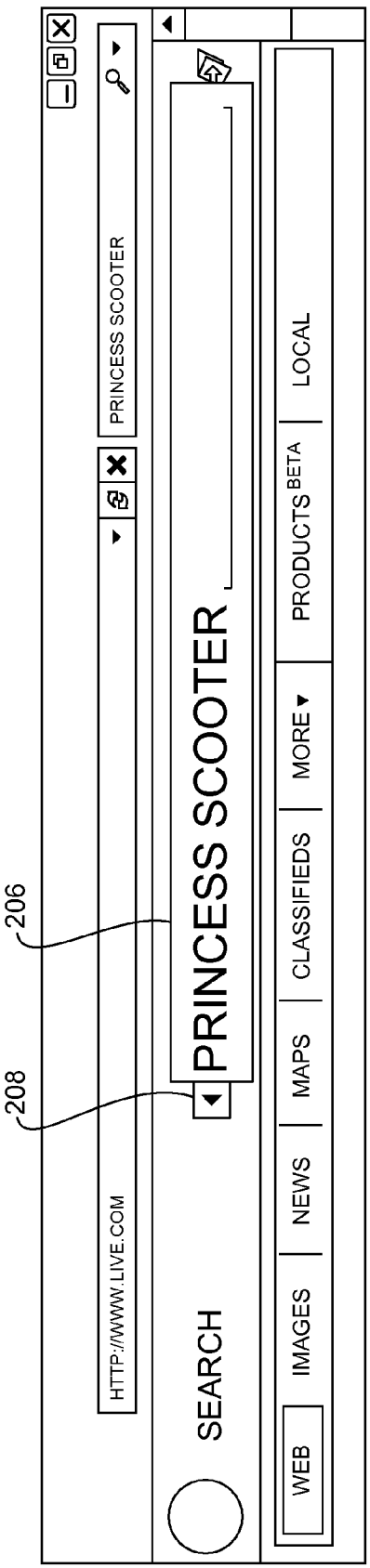
FIG. 2C is a screen display illustrating a pen-friendly textbox in an expanded state in accordance with an embodiment of the present invention.

FIGS. 2A-2C provide screen displays illustrating the hidden, minimized, and expanded states for a pen-friendly textbox in accordance with an embodiment of the present invention. It will be understood and appreciated by those of ordinary skill in the art that the screen displays of FIGS. 2A-2C, as well as other screen displayed illustrated herein, are provided by way of example only and are not intended to limit the scope of the present invention in any way.

Referring initially to FIG. 2A, a screen display is provided illustrating a pen-friendly textbox in the hidden state in accordance with an embodiment of the present invention. As shown in FIG. 2A, the pen-friendly textbox in the hidden state appears as a standard textbox 202. As noted previously, the user may enter text into the textbox 202 while in the hidden state using a keyboard and may perform standard textbox operations using a mouse or other pointing device. In the present example, the pen-friendly textbox is a search query input box provided for receiving a search query, and the user has typed the text "princess scooter" into the textbox 202 as a search query.

The pen-friendly textbox is shown in the minimized state in FIG. 2B. In the minimized state, the pen-friendly textbox continues to be displayed using a standard textbox 202 and includes the text "princess scooter" that was entered in the pen-friendly textbox while in the hidden state. However, an expanded textbox icon 204 is positioned adjacent to the textbox 202. As noted above, the expanded textbox icon 204 may be selected by a user (e.g., by tapping the icon 204 with the pen) to cause the pen-friendly textbox to be displayed in the expanded state. In the present example, the expanded textbox icon 204 is positioned above the textbox 202 and left-aligned with the textbox 202. It should be understood that the expanded textbox icon 204 could be provided in a variety of different locations adjacent to the textbox 202 in various embodiments of the present invention.

Turning to FIG. 2C, the pen-friendly textbox is shown in the expanded state. As shown in FIG. 2C, a writing surface 206 is displayed over the original textbox 202. Additionally, the writing surface includes the text "princess scooter" from the original textbox 202. The writing surface 206 is configured to accept handwriting input and interpret the input as ink strokes. The handwriting input may be initially displayed as digital ink, which may be replaced by text recognized from the handwriting input using a recognizer. Additionally, the writing surface 206 may expand as the user continues to write to provide more space for receiving handwriting input. The writing surface 206 further may support allowing a user to make corrections to text recognized from the user's handwriting directly within the writing surface 206.

As shown in FIG. 2C, the pen-friendly textbox in the expanded state may also include a minimize icon 208 adjacent to the writing surface 206. The minimize icon 208 may be selected by a user (e.g., by tapping the icon 208 with the pen) to cause the pen-friendly textbox to be displayed in the minimized state. Although the minimize icon 208 is shown to the left of the writing surface 206 in FIG. 2C, it should be understood that the minimize icon may be displayed at various locations adjacent to the writing surface 206 in various embodiments of the present invention.

A pen-friendly textbox in accordance with various embodiments of the invention may be displayed in a particular state based at least in part on some user action. For instance, in an embodiment, if the user is interacting with a pen-friendly textbox with a mouse and keyboard, the pen-friendly textbox will be presented in the hidden state. However, if the user gives focus to the pen-friendly textbox with a pen, then the textbox will be presented in the expanded state where the user can update the text content with the pen. Additionally, if the user starts typing on the keyboard while the text control is in the expanded state, the state of the pen-friendly textbox will change to the minimized state, and all keystrokes, including the one that triggered the state change, will be appended to the text in the text control. The following table provides examples of how a pen-friendly textbox may change state as a reaction to different actions in accordance with one embodiment of the invention.

| Action | Current State | New State |
| --- | --- | --- |
| Give focus to pen-friendly textbox by tapping in the textbox | Hidden | Expanded |
| Pen-friendly textbox gets focus without the user tapping | Hidden | Minimized |
| Tap minimize button on the pen-friendly textbox | Expanded | Minimized |
| Changed focus to another textbox (either by user tapping or automatically) | Minimized or Expanded | Hidden |
| Tap expand button | Minimized | Expanded |
| Make a selection in the textbox | Hidden or Minimized | Minimized |
| Right click in the textbox | Hidden or Minimized | Minimized + show context menu |
| Right click on writing surface while in expanded state | Expanded | Minimized + select all text and show context menu |
| Start typing on the keyboard | Minimized or Expanded | Minimized |
| Lose window focus | Expanded | Minimized |

The text in the writing surface of the pen-friendly textbox while in the expanded state and the underlying textbox (while in either the hidden or minimized state) is synchronized. As the user writes or corrects something on the writing surface, the text is updated in the underlying textbox. Additionally, if text gets updated in the underlying textbox while the writing surface is open, then the text in the writing surface is updated.

In previous approaches using an input panel for receiving handwriting and inserting text into a textbox, a user is required to select an "Insert" button to have text from the input panel inserted into the textbox. In embodiments of the present invention, however, because the writing surface of the pen-friendly textbox in the expanded state and the underlying textbox are synchronized, such an "Insert" button is not required.

The placement of the writing surface of the pen-friendly textbox while in the expanded state relative to the underlying textbox is to visually connect the writing surface to the textbox, while also attempting to reduce the extent that the writing surface also covers other displayed text and user interface elements. Generally, the writing surface is placed in a position as to cover the underlying textbox. In some embodiments, the writing surface of a pen-friendly textbox while in the expanded state may be either left-aligned or right-aligned to the underlying textbox. When the writing surface is left-aligned, the minimize icon may be located on the left-hand side of the writing surface, and the writing surface may grow to the right and downwards. When the writing surface is right-aligned, the minimize icon may be located on the right-hand side of the writing surface, and the writing surface may grow to the left and downwards.

Different rules may be applied in various embodiments of the invention to determine the placement of a writing surface relative to the underlying textbox. In some embodiments, the rules to determine placement of the writing surface may depend on whether a left-to-right language or a right-to-left language is being used. For instance, in one embodiment in which a left-to-right language is being used, the rules to determine placement of the writing surface may be biased to use left-alignment. In particular, this will place the left edge of the writing surface based on the left edge of the underlying textbox and allow the writing surface to grow to the right, which is more natural for left-to-right languages. In other words, as a user continues to write to the right, the writing surface will continue to grow in that same direction (as opposed to growing in the opposite direction if right-alignment were employed for a left-to-right language). In an embodiment in which a right-to-left language is being used, the rules to determine placement of the writing surface may be the opposite by being biased to use right-alignment.

In one particular embodiment of the present invention, the following rules are used to determine alignment of a writing surface for a pen-friendly textbox in the expanded state for a left-to-right language (the opposite would be applied for a right-to-left language):

If the left edge of the textbox starts on the left side of the screen, the writing surface is left-aligned based on the textbox.

If both the left edge and the right edge of the textbox are within a predetermined distance from the left screen edge (e.g., 70% from the left screen edge), the writing surface is left-aligned based on the textbox.

If the right edge of the textbox or both the left edge and the right edge of the textbox are not within the predetermined distance from the left screen edge (e.g., 70% from the left screen edge), the writing surface is right-aligned based on the textbox.

Figure 3:
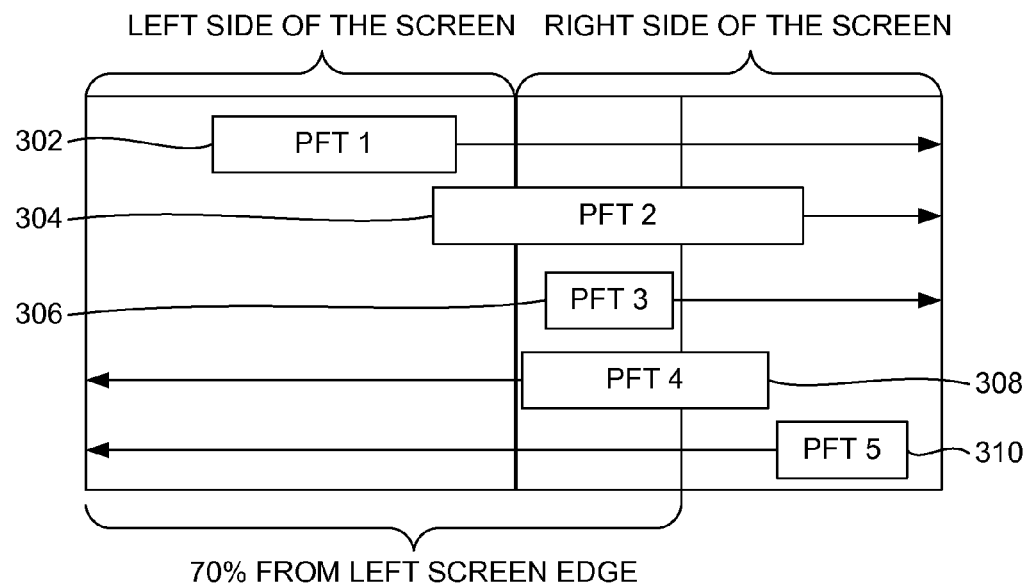
FIG. 3 is a diagram illustrating placement of a writing surface for a pen-friendly textbox while in the expanded state relative to an underlying textbox in accordance with an embodiment of the present invention.

FIG. 3 illustrates an example of how the above rules are applied. In particular, FIG. 3 depicts a screen demonstrating alignment of writing surfaces based on the locations of underlying textboxes according on the above rules. Additionally arrows are provided indicating the direction each writing surface would grow. As shown in FIG. 3, both the left edge and the right edge of pen-friendly textbox 1 (PFT 1) 302 are on the left side of the screen. Based on the first rule above, the writing surface for PFT 1 302 is left-aligned. The left edge of pen-friendly textbox 2 (PFT 2) 304 is on the left side of the screen, while the right edge of PFT 2 304 is on the right side of the screen. Based on the first rule above, the writing surface for PFT 2 304 is left-aligned. Both the left edge and the right edge of pen-friendly textbox 3 (PFT 3) 306 are within 70% from the left edge of the screen. Accordingly, based on the second rule above, the writing surface for the PFT 3 306 is also left-aligned. For pen-friendly textbox 4 (PFT 4) 308, the left edge is on the right side of the screen and the right edge is past 70% from the left edge of the screen. For pen-friendly textbox 5 (PFT 5) 310, both the left edge and the right edge are past 70% from the left edge of the screen. Based on the third rule above (i.e., the first two rules don't apply), both PFT 4 308 and PFT 5 310 are right-aligned.

Comparing PFT 3 306 and PFT 4 308, it should be noted that PFT 4 308 actually would have had more room as left-aligned than PFT 3 306 actually ends up having, although PFT 4 308 ends up being right-aligned. The reasoning for this placement is that the gain of making PFT 4 308 right-aligned versus left-aligned is larger than the gain of making PFT 3 306 right-aligned versus left-aligned. Since the space-loss of going left-aligned for PFT 3 306 is relatively small, it is outweighed by the benefits of being left-aligned.

In some embodiments, the alignment of a writing surface for a pen-friendly textbox in an expanded state may be updated if the location of the underlying textbox is moved. For instance, the location of the underlying textbox may be changed when the application window that is hosting the textbox is moved. In such instances, the location of the writing surface is also updated based on the change to the location of the underlying textbox.

In one embodiment, left-aligned writing surfaces grow horizontally to the right as space is needed as the user continues to provide handwriting input. Additionally, the left-aligned writing surface may grow vertically downward by adding new lines below when necessary. In another embodiment, a left-aligned writing surface may be provided that initially has a maximum width (e.g., continues until the right edge of the screen) and may only grow vertically by adding new lines. However, this approach may result in unnecessarily covering up other text and/or other user interface elements with the writing surface as the width may not be required by the user.

Similarly, in one embodiment, right-aligned writing surfaces grow horizontally to the left as space is needed as the user continues to provide handwriting input. Additionally, the right-aligned writing surface may grow vertically downward by adding new lines below when necessary. However, this approach may be distracting to a user because text must be shifted to the left as the user continues to write. Accordingly, in another embodiment, a right-aligned writing surface may be provided that only grows vertically by adding new lines below when necessary. For instance, a right-aligned writing surface may initially have a maximum width (e.g., continue until the left edge of the screen) and then grow vertically by adding new lines.

Horizontal and/or vertical scrolling may be employed within a writing surface for a pen-friendly textbox in the expanded state in some embodiments. For instance, a writing surface may not be able to grow vertically when the bottom of the screen is reached. In some cases, a writing surface may not be allowed to grow horizontally and/or vertically, for example, to prevent the extent to which the writing surface covers other text and/or user interface elements. Accordingly, a writing surface of a pen-friendly textbox may support horizontal and/or vertical scrolling. In particular, horizontal and/or vertical scroll buttons may be provided to allow a user to scroll text into and out of view of the writing surface.

Figure 4:
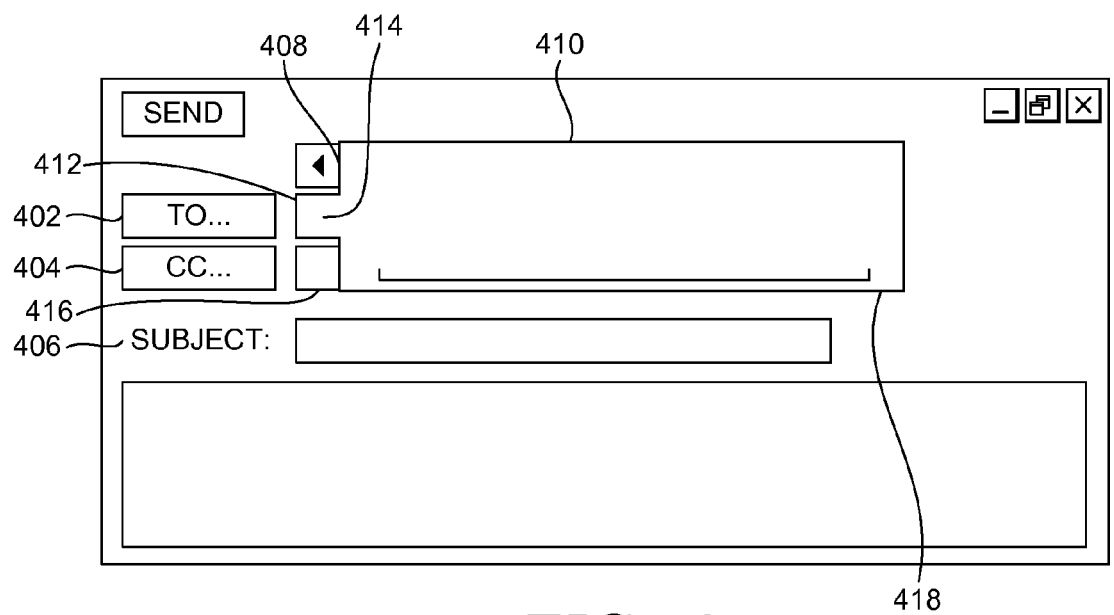
FIG. 4 is a screen display illustrating indentation of a writing surface for a pen-friendly textbox while in the expanded state in accordance with an embodiment of the present invention.

In various embodiment of the present invention, approaches may be taken to limit the extent to which a writing surface of a pen-friendly textbox covers other text and/or user interface elements. As discussed above, placing the writing surface over the underlying textbox utilizes the space consumed by the underlying textbox to reduce the amount of additional space required by the writing surface. The horizontal and/or vertical scrolling noted above may also facilitate reducing the space required for a writing surface. As another example, in an embodiment, an application may override the placement (e.g., alignment and growth behaviors) of a writing surface to prevent important user interface elements from being covered by the writing surface. In a further embodiment, the left edge of a writing surface may be indented from the left edge of the underlying textbox. This allows a user to select another pen-friendly textbox, which is below and left-aligned with the current pen-friendly textbox, without minimizing the writing surface for the current pen-friendly textbox even if the bottom edge of the writing surface extends over the other pen-friendly textbox. For instance, as shown in FIG. 4, an email message is illustrated that includes pen-friendly textboxes for a "To" field 402, a "Cc" field 404, and a "Subject" field 406. The pen-friendly textbox for the "To" field 402 is currently in the expanded state. As shown in FIG. 4, the left edge 408 of the writing surface 410 is indented from the left edge 412 of the underlying textbox 414. As such, a portion of the textbox 416 corresponding with the "Cc" field 404 is available for user selection although the bottom edge 418 of the writing surface extends over that textbox 416. If the writing surface 410 were not indented, the entire textbox 416 for the "Cc" field 404 would be covered by the writing surface 410, thereby requiring the user to minimize the writing surface 410 to allow selection of the textbox 416 for the "Cc" field 404.

Figure 5:
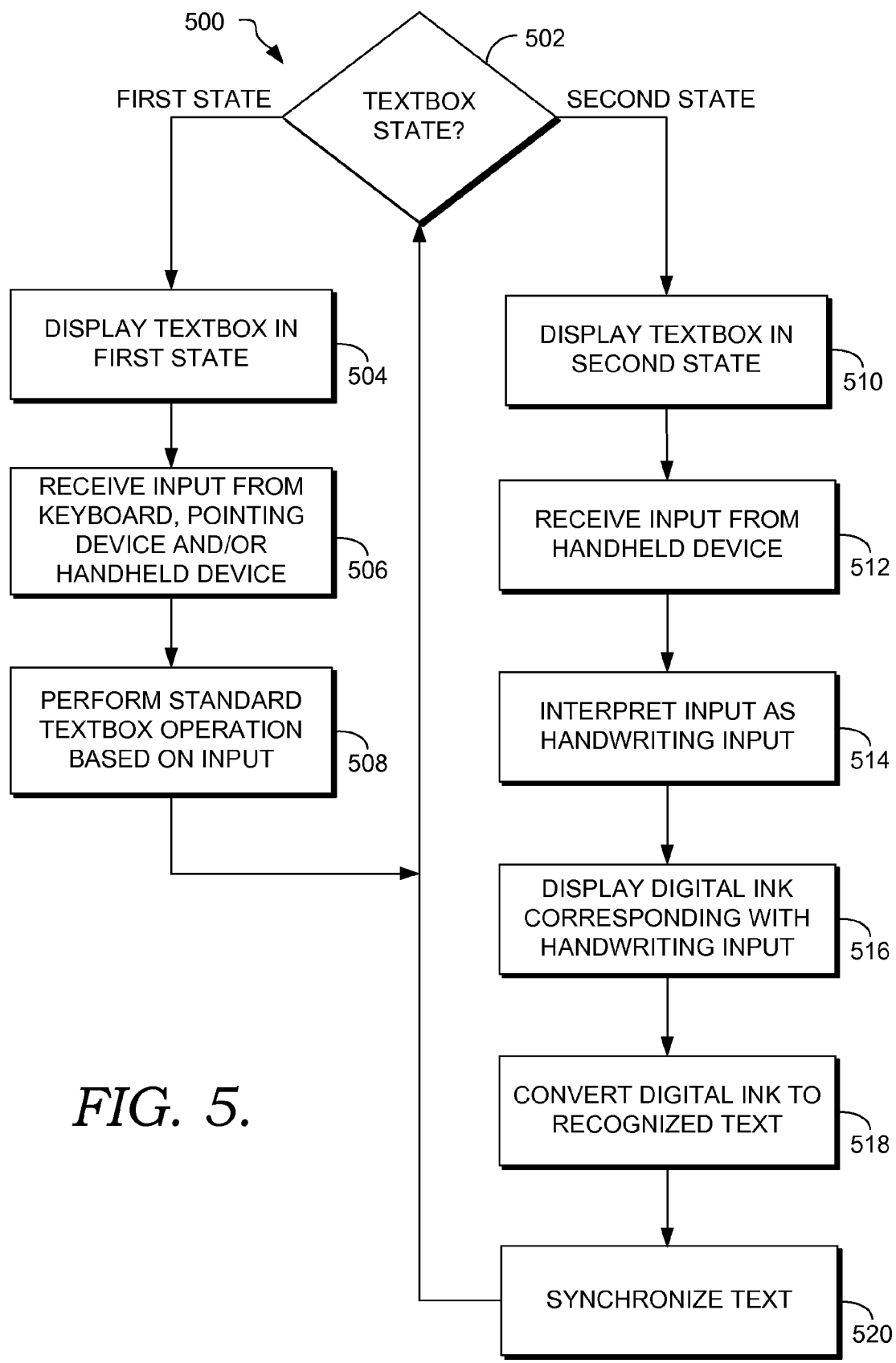
FIG. 5 is a flow diagram showing a method for providing a pen-friendly textbox in accordance with an embodiment of the present invention.

Referring now to FIG. 5, a flow diagram is provided illustrating a method 500 for providing a pen-friendly textbox in accordance with an embodiment of the present invention. As represented by block 502, the system continues to determine in which state to present the pen-friendly textbox. As indicated above, based on different user actions, the pen-friendly textbox will be presented in one of at least two states. If the textbox is presented in the first state, as shown at block 504, the textbox is presented as a standard textbox and is configured to receive input from input devices, such as a keyboard, mouse (or other pointing device), or a handheld writing device (such as an electronic pen or stylus), and perform standard textbox operations based on the input. In particular, the standard textbox operations may include inserting text (based on keyboard input), selecting text, cutting text, copying text, pasting text, deleting text, and undoing previous operations. As shown at block 506, input is received within the textbox from one of the input devices. Based on the input, a standard textbox operation may be performed, as shown at block 508.

A user action may be received that causes the textbox to be displayed in the second state, as shown at block 510. In the second state, the textbox may be displayed as an expanded textbox. In some embodiments, this includes displaying a writing surface over the textbox. The writing surface is configured to receive handwriting input and convert the input to text. In some embodiments, any text that was in the textbox is displayed in the writing surface. As shown at block 512, input is received based on a handheld writing device being moved relative to a digitizer surface. The input is interpreted as handwriting input at block 514. In some cases, other input devices, such as a mouse, may alternatively or additionally be used to provide handwriting input. Based on the handwriting input, digital ink is displayed within the writing surface, as shown at block 516. The handwriting input is sent to a recognizer, which provides recognized text for the handwriting input. The display of the digital ink is then converted to the recognized text, as shown at block 518. Additionally, the text is synchronized to the underlying text box, as shown at block 520. As such, if an action is received that causes the pen-friendly textbox to be displayed in the first state again, the text from the writing surface would be displayed in the textbox in the first state.

Figure 6:
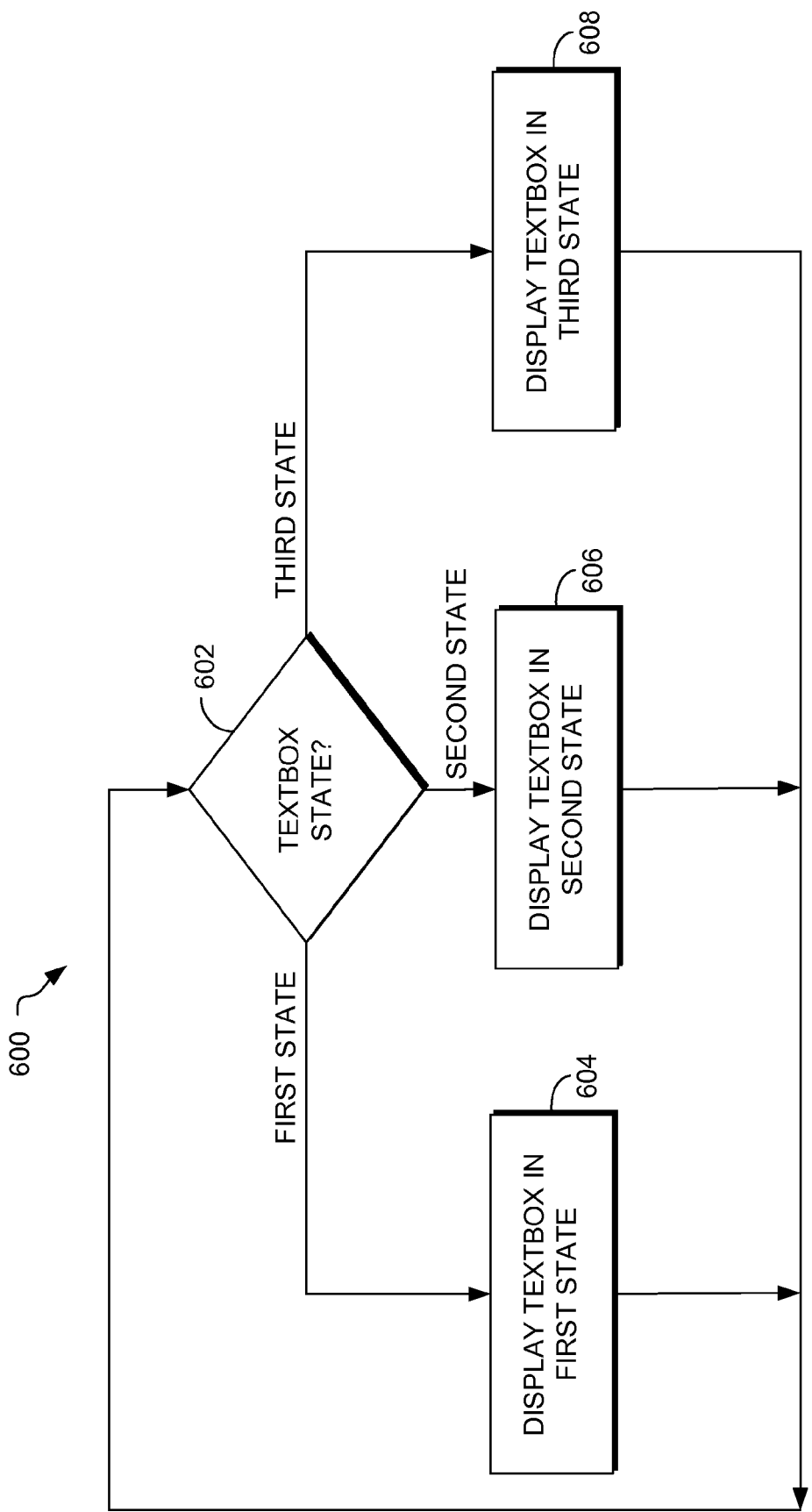
FIG. 6 is a flow diagram showing a method for switching between states for a pen-friendly textbox in accordance with an embodiment of the present invention.

As discussed previously, in some embodiments of the present invention, a pen-friendly textbox may be presented in one of three states: a hidden state, a minimized state, and an expanded state. Turning to FIG. 6, a flow diagram is provided illustrating a method 600 for switching between the three states. In particular, as shown at block 602, a determination is made regarding in which state to present the pen-friendly textbox. The determination may be made based at least in part on the current state of the textbox and/or a type of user action selected. The first state, as shown at block 604, corresponds with the hidden state described hereinabove. As discussed previously, in the hidden state, the pen-friendly textbox is presented as a standard textbox and standard textbox operations may be performed using input from a keyboard and/or a pointing device, such as a mouse. The second state, as shown at block 606, corresponds with the minimized state described hereinabove. In the minimized state, the pen-friendly textbox continues to be displayed as a standard textbox and standard textbox operations may be performed using a keyboard, mouse, and/or a handheld writing device, such as an electronic pen or stylus. Additionally, an expanded state icon is displayed adjacent to the textbox, allowing for a user to cause the pen-friendly textbox to be displayed in the third state, or the expanded state described hereinabove. In the expanded state, as shown at block 608, an expanded textbox is presented. In an embodiment, this includes presenting a writing surface over the standard textbox of the first and second states. The writing surface is configured to receive input from a handheld writing device and interpret the input as handwriting input.

As can be understood, embodiments of the present invention relate to pen-friendly textboxes that provide for integrated handwriting input experience for textboxes. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media embodying computer-useable instructions for performing a method comprising:
   displaying a textbox configured to receive input from a handheld writing device, wherein all input received from the handheld writing device in the textbox is interpreted as one or more standard textbox operations and not as handwriting input;
   based on one or more user actions, displaying an expanded textbox over the textbox, wherein the expanded textbox covers the textbox and is configured to receive input from the handheld writing device, wherein all input received from the handheld writing device in the expanded textbox is interpreted as handwriting input that is initially displayed as digital ink within the expanded textbox and then converted to text within the expanded textbox after the digital ink has been recognized as the text using a recognizer; and
   based on a location of the textbox, determining an alignment of the expanded textbox relative to the textbox.

2. The one or more computer-storage media of claim 1, wherein the expanded textbox is left-aligned with the textbox if a left edge of the text box is located on the left side of a display or if both the left edge and a right edge of the text box are located within a predetermined distance from a left edge of the display.

3. The one or more computer-storage media of claim 1, wherein the expanded textbox is left-aligned with the textbox and a left edge of the expanded textbox is indented a predetermined distance from a left edge of the textbox.

4. The one or more computer-storage media of claim 1, wherein an expanded textbox icon is located adjacent to the textbox, wherein the expanded textbox icon is a graphical user interface element configured to receive a user selection and cause the expanded textbox to be displayed in place of the textbox.

5. The one or more computer-storage media of claim 4, wherein a minimize icon is located adjacent to the expanded textbox, wherein the minimize icon is a graphical user interface element configured to receive a user selection and cause the textbox to be displayed in place of the expanded textbox.

6. The one or more computer-storage media of claim 1, wherein the one or more standard textbox operations comprise one or more of: text select, cut, copy, paste, delete, and undo.

7. The one or more computer-storage media of claim 1, wherein the expanded textbox is configured to grow as a user continues to write using the handheld writing device.

8. The one or more computer-storage media of claim 1, wherein the method further comprises automatically synchronizing the text between the expanded textbox and the textbox.

9. A method for providing handwriting input to a textbox, the method comprising:
   displaying the textbox configured to receive input from a keyboard, a mouse, and a handheld writing device, wherein all input received from the handheld writing device in the textbox is interpreted to perform standard textbox operations and not as handwriting input;
   displaying text within the textbox based on input received from the keyboard;
   based on one or more user actions, displaying a writing surface over the textbox, wherein the writing surface is presented as an enlarged textbox-covering the textbox, and wherein the text from the textbox is displayed within the writing surface;
   determining an alignment of the writing surface relative to the textbox based on a location of the textbox;
   receiving input from the handheld writing device within the writing surface, wherein all input received from the handheld writing device in the enlarged text box is interpreted as handwriting input;
   initially displaying digital ink within the writing surface based on the handwriting input;
   replacing display of the digital ink with display of further text identified from the handwriting input using a recognizer, wherein the further text is displayed with the text from the textbox; and
   automatically synchronizing the further text from the writing surface with the textbox.

10. The method of claim 9, wherein displaying the writing surface over the textbox comprises left-aligning the writing surface with the textbox.

11. The method of claim 10, wherein the method further comprises expanding the writing surface to the right as the input from the handheld writing device is received to provide more space for a user to continue to write within the writing surface using the handheld writing device.

12. The method of claim 10, wherein the displaying the writing surface over the textbox comprises indenting a left edge of the writing surface a predetermined distance from a left edge of the textbox.

13. The method of claim 9, wherein the method further comprises receiving one or more corrections to the further text within the writing surface from the handheld writing device and correcting the further text within the writing surface.

14. The method of claim 9, wherein the method further comprises displaying an expanded textbox icon adjacent to the textbox, and wherein the one or more user actions include receiving a user selection of the expanded textbox icon.

15. One or more computer-storage media embodying computer-useable instructions for performing a method comprising:
- displaying a textbox in a first state, wherein the textbox is displayed as a standard textbox and is configured to receive input from a keyboard and a pointing device, wherein all input received from the pointing device in the textbox is interpreted as standard textbox operations and not handwriting input;
- based on one or more first user actions, displaying the textbox in a second state, wherein the textbox in the second state is configured to receive a first input from a handheld writing device and interpret the first input from the handheld writing device as standard textbox operations, and wherein an icon is displayed adjacent to the textbox, the icon allowing the textbox to be displayed in a third state when the icon is selected; and
- based on one or more second user actions, displaying the textbox in the third state by displaying a writing surface over the textbox, wherein the writing surface covers the textbox and is configured to receive a second input from the handheld writing device and interpret the second input from the handheld writing device as handwriting input, an alignment of the writing surface relative to the textbox being based on a location of the textbox, and wherein text is synchronized between the writing surface and the textbox.

16. The one or more computer-readable media of claim 15, wherein the writing surface is left-aligned with the textbox.

17. The one or more computer-readable media of claim 16, wherein a left edge of the writing surface is indented a predetermined distance from a left edge of the textbox.

18. The one or more computer-readable media of claim 15, wherein the one or more second user actions comprises receiving a selection of the icon.

19. The one or more computer-readable media of claim 15, wherein a second icon is displayed adjacent to the writing surface when the textbox is displayed in the third state, wherein the textbox is displayed in the second state when the second icon is selected.

* * * * *